(12) United States Patent
Bennage et al.

(10) Patent No.: US 6,702,530 B2
(45) Date of Patent: Mar. 9, 2004

(54) DRILL HAVING RECESSED KEY AND BIT HOLDER

(75) Inventors: Walter Bennage, Gurnee, IL (US); Scott Griswold, Highland Park, IL (US); Albert F. Kunz, Arlington Heights, IL (US); Paul Metaxatos, Brookline, MA (US); Bob Bruno, Avon, CT (US)

(73) Assignee: S-B Power Tool Company, Chicago, IL (US)

( * ) Notice: Subject to any disclaimer, the term of this patent is extended or adjusted under 35 U.S.C. 154(b) by 0 days.

(21) Appl. No.: 09/859,689

(22) Filed: May 17, 2001

(65) Prior Publication Data

US 2003/0165366 A1 Sep. 4, 2003

(51) Int. Cl.[7] .............................................. B23B 45/00
(52) U.S. Cl. ................................... 408/241 R
(58) Field of Search .................... 408/241 R; 279/100; 81/177.4

(56) References Cited

U.S. PATENT DOCUMENTS

| 1,647,396 | A |   | 11/1927 | Decker |
| 1,821,436 | A |   | 9/1931 | Holloway |
| 4,032,160 | A |   | 6/1977 | Karasa et al. |
| 4,477,213 | A |   | 10/1984 | Nelson et al. |
| 4,747,733 | A |   | 5/1988 | Akazawa |
| 4,790,696 | A |   | 12/1988 | Williams |
| 4,954,026 | A |   | 9/1990 | Zurwelle |
| 5,740,706 | A | * | 4/1998 | Tseng .......................... 81/177.4 |
| 5,810,525 | A |   | 9/1998 | Ector, Sr. |
| 6,032,332 | A | * | 3/2000 | Lin ............................ 16/111.1 |
| 6,334,743 | B1 | * | 1/2002 | Liao ............................ 408/124 |
| 6,364,580 | B1 | * | 4/2002 | Dils et al. ..................... 408/16 |

* cited by examiner

Primary Examiner—Mark S. Graham
(74) Attorney, Agent, or Firm—Greer, Burns & Crain, Ltd.

(57) ABSTRACT

A recessed key and bit holder for detachably holding at least one drill part such as a drill bit and a chuck key having a chuck key handle and a chuck head, onto a handle base of a power tool. There is at least one recessed area disposed on an enlarged handle base, and at least one spring clip having an anchor end and a retaining end. The anchor end is mounted inside the handle base and the retaining end is located inside the recessed area. The structure also has a finger relief cutout portion formed in connection with the recessed area. The recessed area has a handle portion and a head portion, where the handle portion is shaped to accommodate the chuck key handle and drill bit, and the head portion is shaped to accommodate the chuck head.

10 Claims, 4 Drawing Sheets

DRILL HAVING RECESSED KEY AND BIT HOLDER

BACKGROUND OF THE INVENTION

The present invention generally relates to power tools, and more particularly to a hand held power drill with a drill housing recessed key and bit holder.

Power drills can be used with several different sized drill bits or similar pieces that must be firmly held in a chuck before the tool may be used on a workpiece. To adjust the size of the mouth of the chuck to insert and remove different drill bits, a chuck key is usually required. There have been attempts to mount the chuck key in the housing of the power tool, which allows the chuck key to be readily available.

Although there are power drills adapted to store the chuck key, in some of these devices it is very difficult to remove the chuck key from the power drill. In other devices the chuck key is not held firmly enough to prevent the chuck key from being lost.

Another disadvantage of previous power drills is that there is no room to store extra drill bits on the power drill. A further disadvantage with these previous devices is that the storage area is only designed to store a chuck key and not a drill bit in its place.

Yet another disadvantage is that with compact power drills, there is insufficient room on the housing for storing the chuck key.

BRIEF SUMMARY OF THE INVENTION

The power tool embodying the present invention has a housing recessed key and bit holder, and features an enlarged handle base to allow special recessed areas to capture a drill chuck key or a drill bit. A large cutout connected with the recessed area allows a user's finger to remove the chuck key or drill bit from the recessed areas. A specially designed spring acts on one side of the chuck key or drill bit and retains the parts in the recessed area with a nominal adequate force.

Another feature of the preferred embodiment of the present invention is a full size drill, having a housing with two special recessed areas on the drill handle to capture a chuck key and drill bit in either position. With a compact drill embodiment, there is a special recessed area on the drill handle that will capture either the chuck key or the drill bit.

DETAILED DESCRIPTION OF THE INVENTION

Broadly stated, the present invention embodies a power tool, preferably a power drill but not limited to only a drill, which has a housing that has at least one recessed area for holding a drill bit or a chuck key. In one embodiment, a compact drill has one recessed area for holding a bit or a key, and a second embodiment has two recesses for holding both a chuck key and a drill bit.

Figure 1:
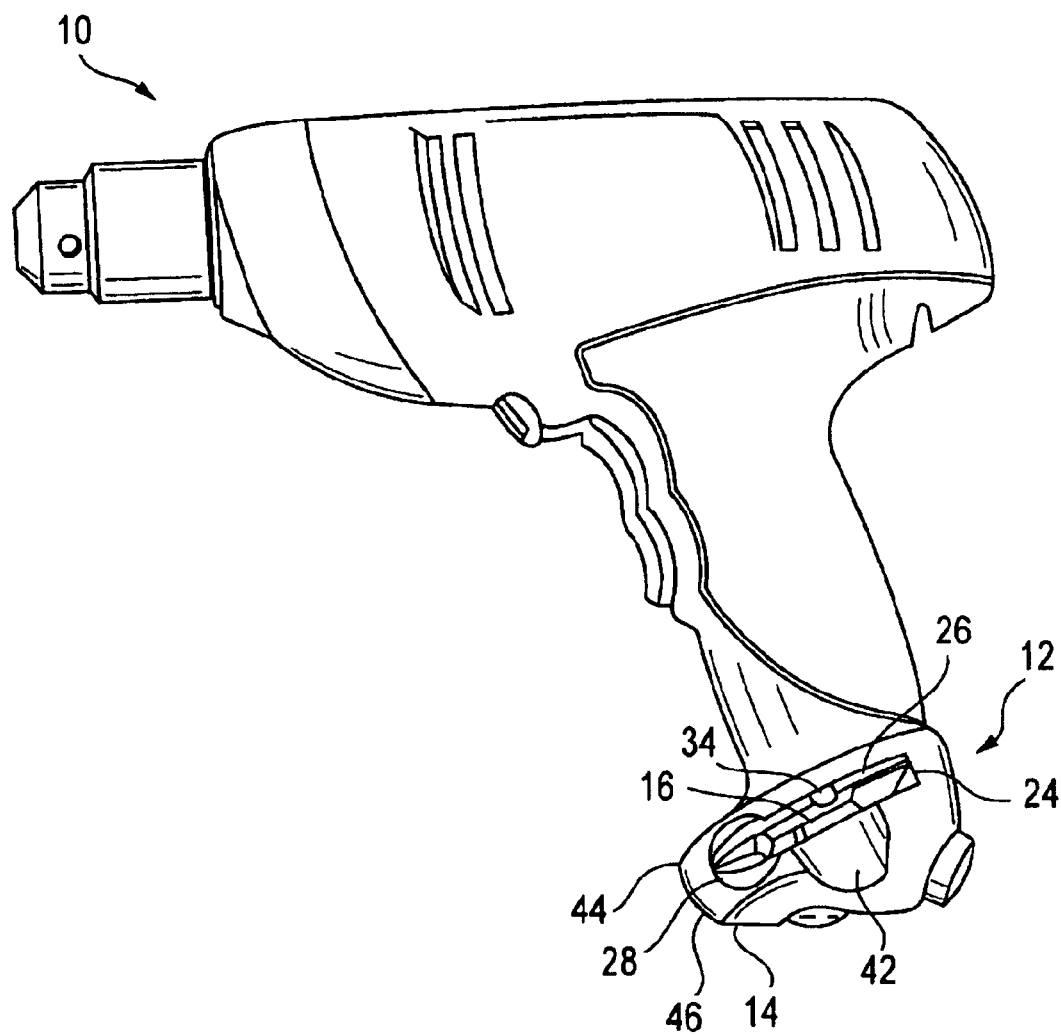
FIG. 1 is an elevational side view of a compact power drill with the drill housing recessed key and bit holder.
Figure 3:
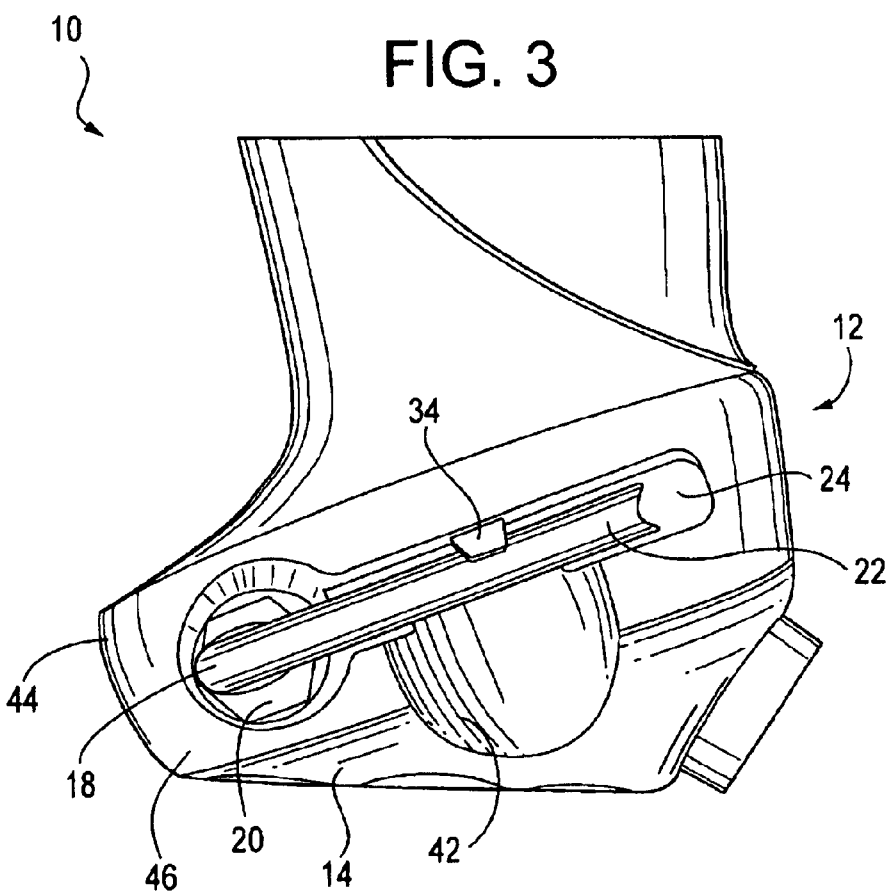
FIG. 3 is a partial elevational view of an enlarged handle base on a compact power tool with the drill housing recessed key and bit holder.

Turning now to the drawings, a power tool which in this case is a compact power drill, indicated generally at 10, is shown in FIGS. 1 and 3, with a recessed key and bit (holder, indicated generally at 12, for detachably holding a tool part onto a handle base 14 of the power tool. When the power tool 10 is a power drill, as illustrated here, the tool parts may include a hex bit 16 shown as a screw driver or a chuck key 18 having a geared or chuck key head 20 and a chuck key handle 22. A recess or recess area 24 is provided in the handle base 14 for receiving the hex bit 16 or the chuck key 18.

The recessed area 24 is formed on one side of the enlarged handle base 14. For the purpose of this invention, having the recessed area 24 on either side of the enlarged handle 14 is contemplated and is within the scope of the invention.

Figure 2:
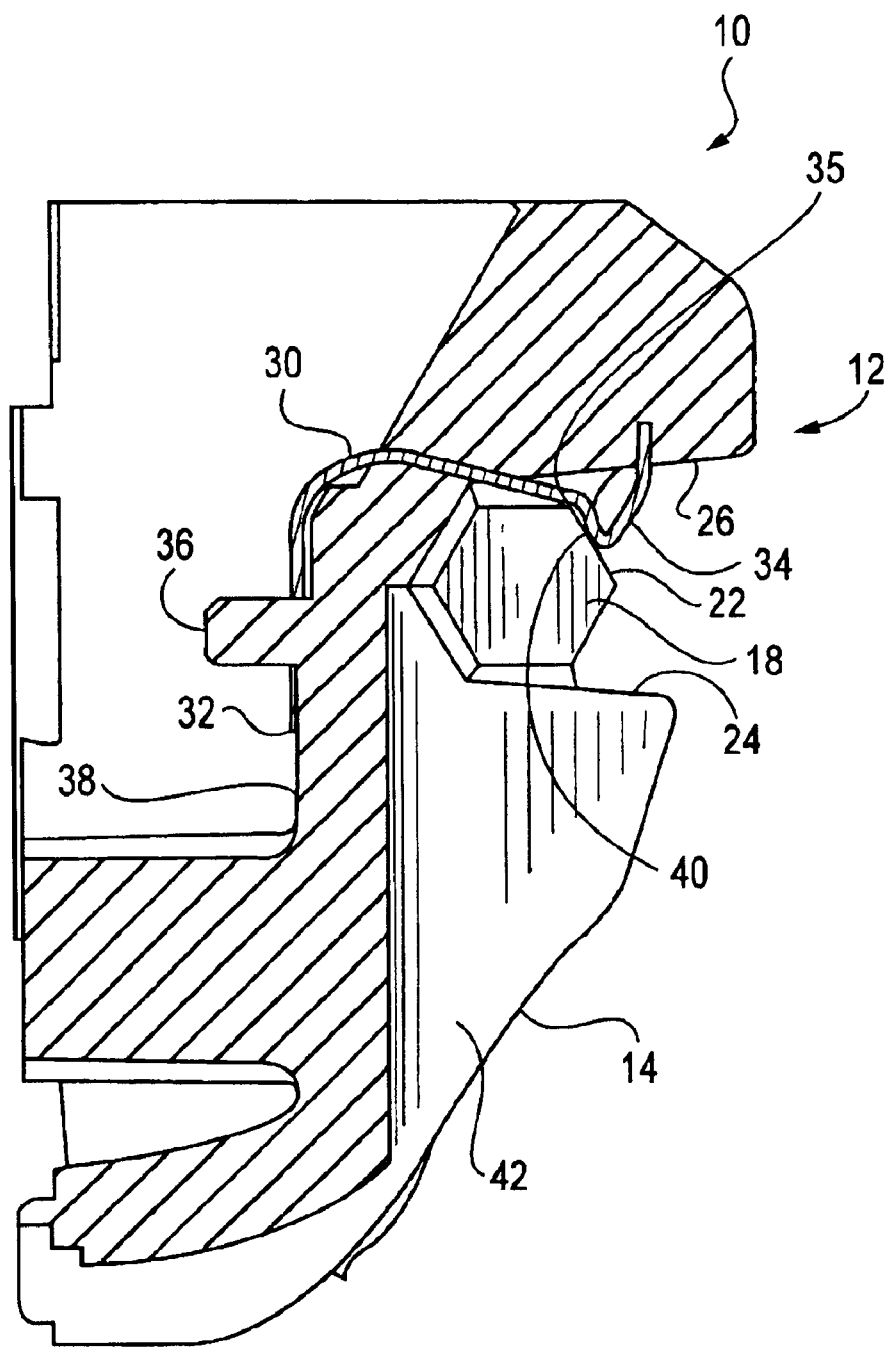
FIG. 2 is a partial cross sectional view of the drill housing recessed key and bit holder of FIG. 1, with the configuration of the single spring clip and the recessed area being similar to the alternative embodiment having two such spring clips and recessed areas.

Included in the recessed area 24 is a handle portion 26 and a head portion 28, whereby the handle portion is shaped to accommodate the chuck key handle 22 or the hex bit 16, and the head portion is designed to accommodate the chuck key head 20. As shown in FIG. 2, it is preferred that the handle portion 26 of the recessed area 24 be polygonally shaped to better fit hexagonal shaped drill bits. However, it should be understood that the handle portion 26 may be designed with many different shapes including a curved surface.

In one embodiment, the head portion 28 is a hole that extends through the enlarged handle base 14, or it may be a blind end bore that does not extend through the enlarged handle base. It is only necessary that the head portion 28 be of proper size to hold the chuck key head 20.

As is best shown in FIG. 2, a spring clip 30 is provided that has an anchor end 32 and a retaining end 34, with the anchor end mounted inside the handle base 14 and the retaining end located inside the recessed area 24. The anchor end 32 of the spring clip 30 is mounted over a post 36 located on an interior wall 38 of the handle base 14. There is a hole 35 located through the wall 38 allowing the retaining end 34 of the spring clip 30 to extend into the recessed area 24. A hook 40 is formed on the retaining end 34, and it is the hook that applies a retaining force to the tool part (hex bit 16 or chuck key 18).

This construction allows the tool part to be captured inside the recessed area 24 by the spring clip 30. When placing either the hex bit 16 or chuck key 18 into the recessed key and bit holder 12, the spring clip 30 bends so the tool part may be fitted into the recessed area 24. Once in the recessed area 24, the spring clip 30 applies force to the outside of the tool part, thereby holding it in place. In the embodiment of a compact drill as illustrated in FIGS. 1–3, there is preferably only one spring clip 30 in the recessed area 24, but more than one spring clip may be used to apply more force to the tool part, if desired.

In accordance with an important aspect of the present invention and referring to the embodiment of FIG. 1, the recessed key and bit holder 12 also has a finger relief cutout or cutout portion 42 formed in connection with the recessed area 24. The finger relief cutout portion 42 is sized to accommodate at least one finger of the user. It is preferred that the finger relief cutout portion 42 be formed on the lower or bottom surface of the recessed area 24 and is in communication therewith, since the spring clip 30 is located near the top of the recessed area. To remove the tool part from the recessed key and bit holder 12, the user simply inserts a finger in the finger relief cutout portion 42 and pulls the tool part from the power tool 10.

In a compact drill embodiment of the present invention, a distal end 44 of the handle base 14 has an enlarged end portion 46. The size of the enlarged end portion 46 can vary depending on the size of the power tool 10 and the size of the tool parts that will be stored in this area.

Figure 5:
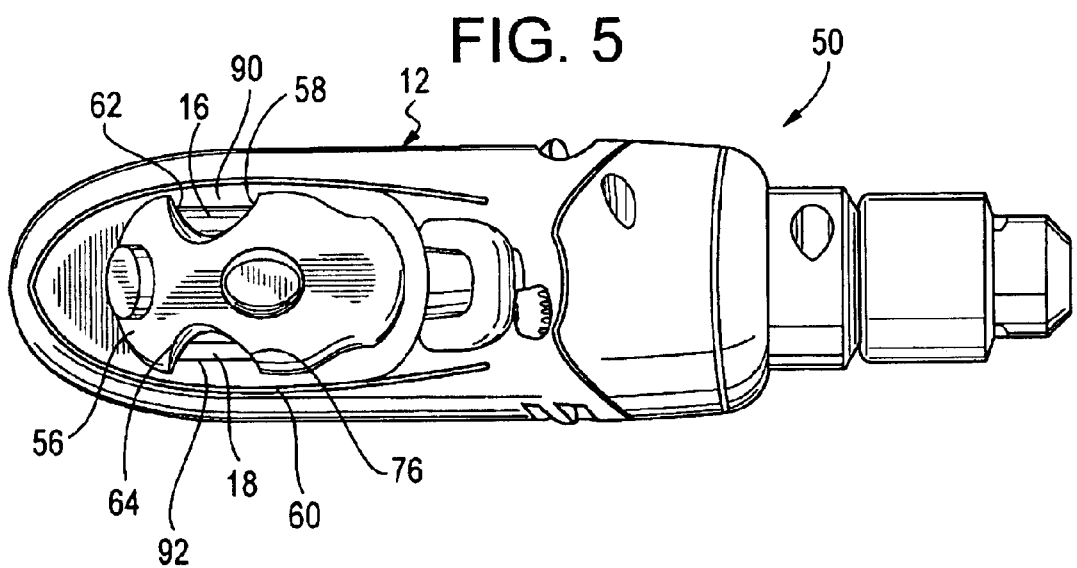
FIG. 5 is a bottom plan view of the full size power tool with the drill housing recessed key and bit holder.
Figure 4:
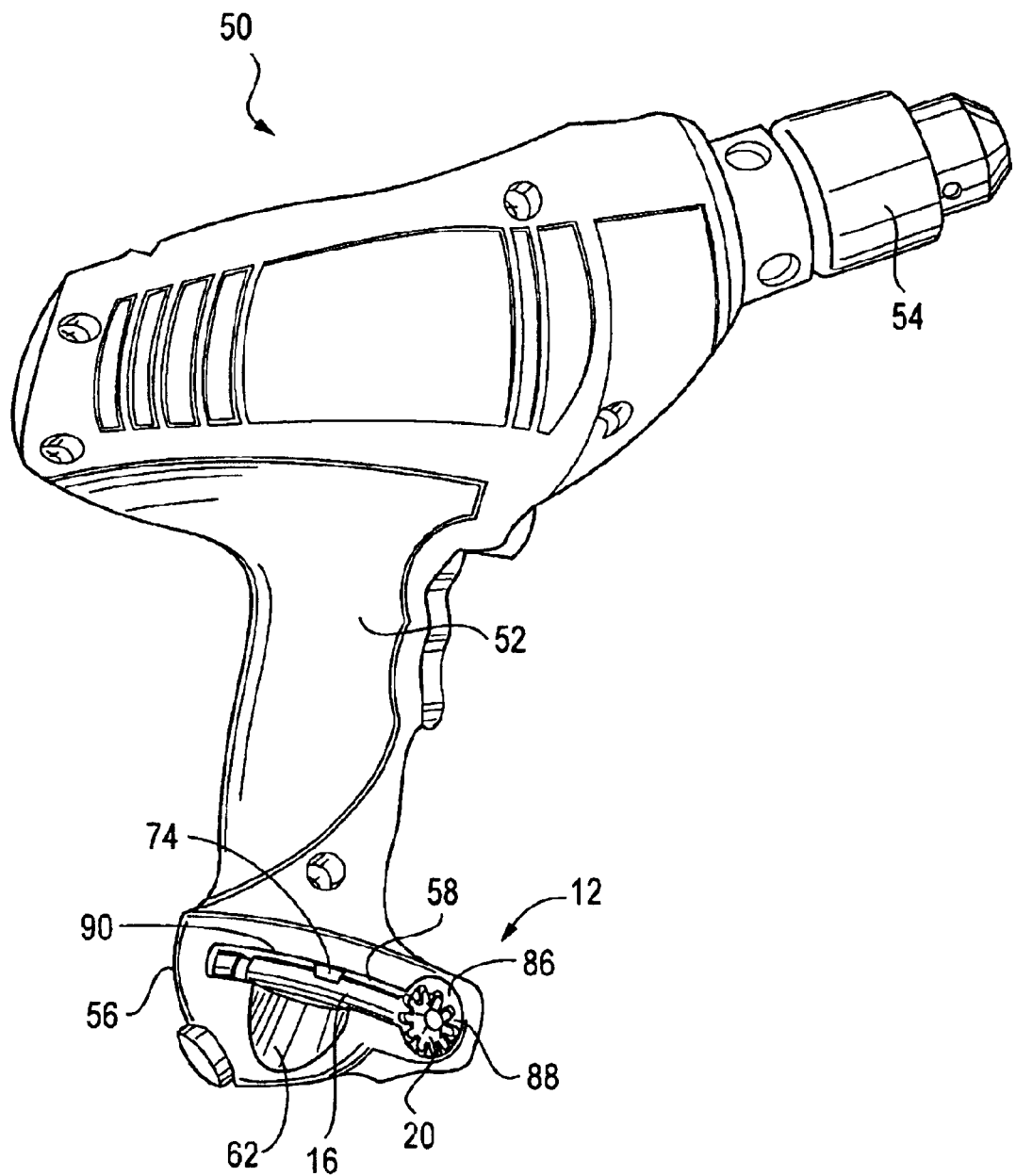
FIG. 4 is an elevational side view of a full size power tool embodiment with the drill housing recessed key and bit holder.

The full size power drill embodiment of the present invention is shown in FIGS. 4 and 5, and is indicated generally at 50. Common components of the tools 10 and 50 are designated with identical reference numbers. The drill 50 detachably holds an operating tool such as the hex bit 16 and an attachment tool such as a chuck key 18 having the handle 22 and the head 20. Other contemplated operating tools include screwdrivers, sockets, Allen head drivers and the like. The power tool 50 has a housing 52 with a tool motor (not shown) operably attached to a chuck mechanism 54 for holding the operating tool.

Referring to FIGS. 4 and 5, the drill 50 has an enlarged handle base 56 attached to the housing 52, with a first recessed area 58 and a second recessed area 60 formed on opposite sides of the enlarged handle base. There is a first finger relief cutout 62 and a second finger relief cutout 64 formed on opposite sides of the enlarged handle base 56.

Also included in this embodiment is a first spring clip 74 having a first anchor end and a first retaining end, similar to the spring clip 30, and a second spring clip 76 on the opposite side having a second anchor end and a second retaining end. The first and second anchor ends are both mounted in the interior of the enlarged handle base 56, in the same manner that was discussed above with regard to the spring clip 30. This design allows one tool part to be held in the first recessed area 58 by the first spring clip 74, and another tool part to be held in the second recessed area 60 by the second spring clip 76.

Also in the full size drill embodiment, there is a head portion 86 that forms a hole 88 (best seen in FIG. 4) completely through the enlarged handle base 56 and merges the first recessed area 58 with the second recessed area 60. This head portion 86 provides a space for the attachment tool head 20 to occupy when it is being held by the recessed key and bit holder 12. The first recessed area 58 has a first handle portion 90 and the second recessed area 60 has a second handle portion 92. Both the first and second handle portions 90 and 92 are shaped to accommodate the attachment tool or chuck key handle 22 and the operating tool or hex bit 16. FIG. 4 shows the hexagonal screw driver-type hex bit 16 and the chuck key 18 being held by the recessed key and bit holder 12. It is preferred that first and second handle portions 90 and 92 be polygonally shaped in order to better hold a hexagonal drill bit, however other configurations are contemplated for achieving this result.

From the foregoing, it should be appreciated that an improved drill housing recessed key and bit holder has been shown and described which has many desirable advantages and attributes. The structure provides a convenient holder that firmly holds both a chuck key and an operational tool such as a drill bit, and allows for easy detachment of those parts.

While particular embodiments of the drill housing recessed key and bit holder have been shown and described, it will be appreciated by those skilled in the art that changes and modifications may be made thereto without departing from the invention in its broader aspects and as set forth in the following claims.

Various features of the invention are set forth in the appended claims.

What is claimed is:

1. A structure for detachably holding at least one tool part taken from the group consisting of a bit and a chuck key having a chuck key handle and a chuck key head, onto a handle base of a power tool, comprising:

a distal end of the handle base has an enlarged end portion;

at least one recessed area disposed in the enlarged handle base on a side of said base for defining a laterally accessible opening;

a finger relief cutout portion formed in communication with said recessed area; and at least one spring clip having an anchor end and a retaining end, said anchor end being mounted inside the handle base and said retaining end located inside said recessed area;

whereby the tool part is captured inside said recessed area by said spring clip; and wherein said at least one recessed area has a handle portion and a head portion, whereby said handle portion is shaped to accommodate either one of the chuck key handle and the bit, said head portion being shaped to accommodate and fully enclose the chuck key head, said head portion is in communication with said handle portion, and said recessed area is configured for lateral insertion or withdrawal of either one of the chuck key and the bit.

2. The structure of claim 1 wherein said handle portion of said recessed area is polygonally shaped.

3. The structure of claim 1 wherein said head portion is shaped to fully encircle a head of the chuck key.

4. A hand tool for detachably holding a tool taken from the group consisting of an operating tool and an attachment tool having a handle and a head, said hand tool comprising:

a housing having a tool motor operably attached to a mechanism for holding the operating tool;

an enlarged handle base attached to said housing;

a first recessed area and a second recessed area formed on opposite sides of said enlarged handle base for defining a pair of opposed, laterally accessible openings;

a first finger relief cutout and a second finger relief cutout formed on opposite sides of said enlarged handle base; and, a first spring clip having a first anchor end and a first retaining end, and a second spring clip having a second anchor end and a second retaining end, said first and second anchor ends being mounted inside said enlarged handle base, said first retaining end being located in said first recessed area, and said second retaining end being located in said second recessed area;

one tool part is held in said first recessed area by said first spring clip, and another tool part is held in said second recessed area by said second spring clip; and wherein said first and second recessed areas each have a laterally accessible opening and includes a handle portion and a head portion, whereby said handle portion is shaped to accommodate the operating tool and the attachment tool, said head portion is in communication with said handle portion and is shaped to accommodate and fully encircle a head portion of the attachment tool upon lateral insertion of the tool into said recess; and said head portions in each recess define a hole through said enlarged handle base and create communication between said first recessed area and said second recessed area at one end, whereby said head portions are configured to accommodate the attachment tool head regardless of whether the tool is disposed in said first or said second recessed area.

5. The hand tool of claim 4 wherein said first recessed area has a first handle portion and said second recessed area has a second handle portion, said first and second handle portions being shaped to accommodate the attachment tool handle and the operating tool, said spring clips being disposed to engage one of the handle of the attachment tool and the operating tool.

6. The hand tool of claim 5 wherein said first and second handle portions are polygonally shaped.

7. A hand tool for detachably holding a tool part taken from the group consisting of an operating tool and an attachment tool having a handle and a head, said hand tool comprising:

a housing having a tool motor operably attached to a mechanism for holding the operating tool;

an enlarged handle base attached to said housing;

a recessed area formed on one side of said enlarged handle base for defining a laterally accessible opening;

a finger relief cutout formed in connection with said recessed area; and, a spring clip having an anchor end and a retaining end, said anchor end being mounted inside said enlarged handle base and said retaining end being located in said recessed area;

whereby one tool part is held in said recessed area by said spring clip; and wherein said recessed area has a handle portion and a head portion, whereby said handle portion is shaped to accommodate either one of the attachment tool and the operating tool, said head portion is in communication with said handle portion and is shaped to accommodate and fully enclose a portion of the attachment tool and said recessed area is configured for lateral insertion or withdrawal of either one of the attachment tool and the operating tool.

8. The structure of claim 7 wherein said handle portion is polygonally shaped.

9. The structure of claim 7 wherein said finger relief cutout is in communication with said recessed area.

10. The structure of claim 7 wherein said head portion is shaped to fully encircle a head of the attachment tool.

* * * * *